United States Patent [19]
Duley et al.

[11] Patent Number: 4,972,061
[45] Date of Patent: Nov. 20, 1990

[54] LASER SURFACE TREATMENT

[76] Inventors: Walter W. Duley, 98 McClure Drive, King City, Ontario, Canada, L0G 1K0; Grant Kinsman, 2 Assiniboine Road, Apt. 722, Downsview, Ontario, Canada, M3J 1L1

[21] Appl. No.: 317,261

[22] Filed: Feb. 28, 1989

Related U.S. Application Data

[63] Continuation-in-part of Ser. No. 134,040, Dec. 17, 1987, abandoned.

[51] Int. Cl.⁵ .............................................. B23K 26/00
[52] U.S. Cl. ......................... 219/121.66; 219/121.69; 219/121.8; 219/121.85
[58] Field of Search ........... 219/121.6, 121.65, 121.66, 219/121.68, 121.69, 121.8, 121.85

[56] References Cited

U.S. PATENT DOCUMENTS

| | | | |
|---|---|---|---|
| 3,003,493 | 10/1961 | Miller | 125/20 |
| 3,112,114 | 11/1963 | Jacobs | 277/205 |
| 3,229,095 | 1/1966 | Lasher et al. | 219/121.76 |
| 3,357,319 | 12/1967 | Hagerty | 92/245 |
| 3,473,000 | 10/1969 | Siekman et al. | 219/121.63 |
| 3,569,660 | 3/1971 | Houldcroft | 219/121.67 |
| 3,604,890 | 9/1971 | Mullaney et al. | 219/121.62 |
| 3,663,793 | 5/1972 | Petro et al. | 219/121.85 |
| 3,700,850 | 10/1972 | Lumley et al. | 219/121.85 |
| 3,832,948 | 9/1974 | Barker | 219/121.85 X |
| 3,932,726 | 1/1976 | Verheyen et al. | 219/121.85 |
| 3,935,419 | 1/1976 | Lambert et al. | 219/121.85 |
| 3,945,825 | 3/1976 | Gale et al. | 350/3.5 |
| 3,965,327 | 6/1976 | Ehlscheid et al. | 219/121.85 |
| 4,028,523 | 6/1977 | Anderl et al. | 219/121.85 X |
| 4,045,318 | 8/1977 | Himics et al. | 204/192 E |
| 4,087,672 | 5/1978 | Yi | 219/121.85 |
| 4,108,659 | 8/1978 | Dini | 346/76 L X |
| 4,117,177 | 9/1978 | Schlafer | 427/53 |
| 4,139,409 | 2/1979 | Macken et al. | 219/121.85 |
| 4,152,575 | 5/1979 | Banas | 219/121.85 |
| 4,160,894 | 7/1979 | Stemmler et al. | 219/121.67 |
| 4,200,875 | 4/1980 | Galanos | 346/76 L X |

(List continued on next page.)

FOREIGN PATENT DOCUMENTS

| | | |
|---|---|---|
| 0036680 | 2/1981 | European Pat. Off. . |
| 3411797 | 3/1984 | Fed. Rep. of Germany . |
| 3425263 | 7/1984 | Fed. Rep. of Germany . |
| 51-50851 | 5/1976 | Japan . |
| 57-169612 | 10/1982 | Japan . |
| 0214142 | 9/1987 | Japan .............................. 219/121.17 |
| 2045669 | 3/1979 | United Kingdom . |

OTHER PUBLICATIONS

Patent Abstracts of Japan, vol. 7, No. 214 (E-199) (1359), Sep. 21, 1983–Japanese Patent No. 58-10683-6(A).
Patent Abstracts of Japan, vol. 7, No. 286 (P-244) (1431), Dec. 21, 1983–Japanese Patent No. 58-15951-4(A).
Patent Abstracts of Japan, vol. 10, No. 115 (M-474) (2172), Apr. 30, 1986–Japanese Patent No. 60-24449-5(A).
Patent Abstracts of Japan, vol. 7, No. 55 (M-198) (1200), Mar. 5, 1983–Japanese Patent No. 57-20299-2(A).
W. W. Duley, Laser Processing and Analysis of Materials, 1983, pp. 69–78.

(List continued on next page.)

*Primary Examiner*—C. L. Albritton
*Attorney, Agent, or Firm*—Fleit, Jacobson, Cohn, Price, Holman & Stern

[57] ABSTRACT

A method of modifying the reflectivity and emissivity of a surface of a material comprises the steps of irradiating the surface with a beam of coherent pulsed radiation at a power sufficient to generate a surface plasma and scanning said beam across said surface. Successive pulses of radiation are caused to overlap and chemical change at the surface is promoted by provision of a localized atmosphere. The surface produced has features on a scale of less than 50 microns and is restricted to a depth of less than $10^{-3}$ cm. The body of the material is not affected.

17 Claims, 17 Drawing Sheets

U.S. PATENT DOCUMENTS

| | | |
|---|---|---|
| 4,214,249 | 7/1980 | Kasai et al. .................... 346/76 L |
| 4,288,528 | 9/1981 | Picquendar et al. .......... 346/76 L X |
| 4,377,735 | 3/1983 | Minamida et al. ............. 219/121.85 |
| 4,377,736 | 3/1983 | Daunt et al. ................... 219/121.68 |
| 4,395,616 | 7/1983 | Smith et al. .................... 219/121.6 |
| 4,408,602 | 10/1983 | Nakajima ....................... 219/121.76 |
| 4,412,231 | 10/1983 | Namba et al. .................. 346/76 L |
| 4,414,059 | 11/1983 | Blum et al. .................. 219/121.85 X |
| 4,417,948 | 11/1983 | Mayne-Banton et al. ..... 219/121.85 X |
| 4,454,179 | 6/1984 | Bennett et al. ................ 427/147 X |
| 4,500,771 | 2/1985 | Miller ............................ 219/121.68 |
| 4,535,218 | 8/1985 | Krause et al. ................. 219/121.68 |
| 4,535,998 | 8/1985 | Katz ............................... 277/212 FB |
| 4,547,649 | 10/1985 | Butt et al. ...................... 219/121.68 |
| 4,578,329 | 3/1986 | Holsappel ..................... 219/121.68 X |
| 4,600,686 | 7/1986 | Meyer et al. .................. 156/628 |
| 4,634,645 | 1/1987 | Matsuda et al. .............. 430/30 |
| 4,656,079 | 4/1987 | Yamada et al. ................ 346/762 X |
| 4,670,639 | 6/1987 | Behn ............................. 219/121.69 |
| 4,707,584 | 11/1987 | Kimbara ........................ 219/121.67 |
| 4,769,257 | 9/1988 | Duley et al. ................... 427/53.1 |

OTHER PUBLICATIONS

W. W. Duley, "Laser Material Interactions of Relevance to Metal Surface Treatment," Draper and Mazzoldi (eds.), Laser Surface Treatment of Metals, 1986, pp. 3–16.

"Moire Displacement Measurement Technique for a Linear Encoder", 1012 *Optics and Laser Technology*, to 17 (1985), Apr., No. 2, London, Great Britain.

"Collimation Test by Double Grating Shearing Interferometer", Patorski, Yokozeki and Suzuki, Applied Optics, vol. 15, No. 5, May 1976.

"Position Monitoring Technique Using Double Diffraction Phenomenon", Optics Communications, vol. 27, No. 3, Dec. 1978.

LASER SURFACE TREATMENT

This application is a continuation-in-part of application Ser. No. 07/134,040 filed Dec. 17, 1987, now abandoned.

The present invention relates to a method of modifying the reflectivity and/or of a surface of a metal.

Most surfaces reflect radiation over a wide range of wavelengths and do so with a varying reflectivity at different wavelengths. This characteristic can be used in a number of ways and has differing effects. For example, in an armaments environment, a laser is used to interrogate a vehicle and the signature of the vehicle is determined by the reflectivity of the surface. This is used to identify an enemy and the type of vehicle. The emissivity of a surface, which is related physically to the surface reflectivity is also an important parameter in determining the rate with which a surface loses or gains heat by radiation. The emissivity of a surface is for example critical in the cooling of spacecraft where maximum emissivity is desirable to reduce the temperature of the spacecraft and avoid damage to the vehicle. Such surfaces would have a low reflectivity at wavelengths in the infrared.

The emissivity of a surface can be modified in a number of ways. To enhance cooling of a surface in a spacecraft it is known to use special paints but these are prone to erosion due to the radiation, atoms and ions present in space. Similarly, specific materials or paints have been used on armaments to change their reflective characteristics and reduce their reflectivity to radar and laser range-finding devices. However, these treatments tend to be expensive and not permanent.

It is, therefore, an object of the present invention to provide a method of modifying the reflectivity and hence the emissivity of a surface that obviates or mitigates the above disadvantages.

According therefore to the present invention there is provided a method of modifying the reflectivity of a surface of a material comprising the steps of irradiating the surface with a beam of coherent pulsed radiation, said pulsed radiation being at a power level sufficient to melt the surface and thereby to generate a surface plasma so that the shock wave associated with the surface plasma produces a roughening of said surface; and repeatedly scanning said beam across said surface to form successive closely spaced lines on said surface as a result of said roughening of said surface.

In general terms the present invention modifies the reflectivity of a surface by generating a surface plasma which, combined with the pulsed nature of the radiation, produces fine surface irregularities and leads to a change, typically a reduction, in the reflectivity of the surface. A chemical change is also enhanced with the surface plasma that is generated. This chemical change at the surface can be promoted by providing a localized atmosphere of a specific gas, for example oxygen to promote oxidation of the surface. This processing also has the effect of modifying the thermal emissivity of these surfaces.

It has also been found that the surface produced leads to a significant increase in the convection losses thereby improving the heat transfer characteristics of the material.

Embodiments of the invention will now be described by way of example only with reference to the accompanying drawings in which FIG. 1 is a perspective representation of a laser surface treatment technique;

Figure 1:
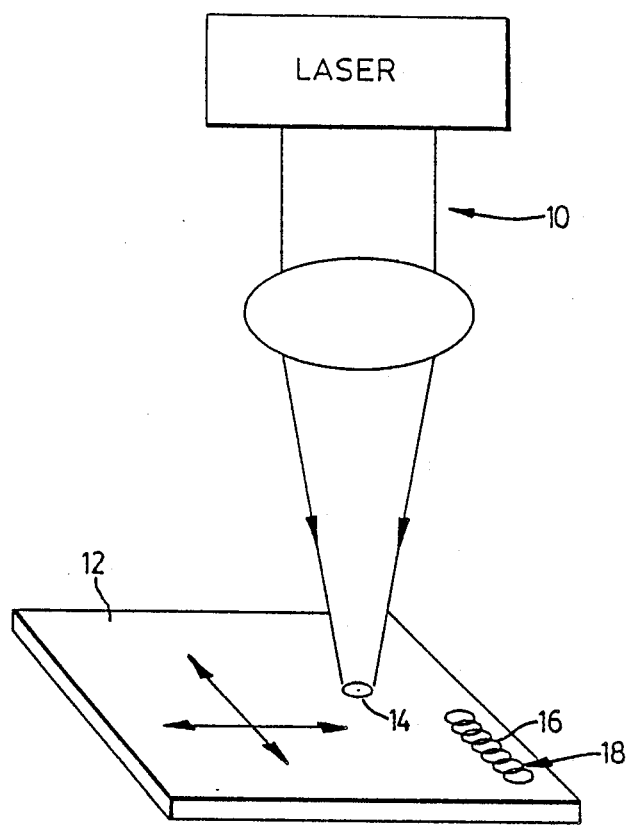

Referring therefore to the drawings, in FIG. 1 there is shown a laser 10 irradiating a surface 12 of a material. The laser is finely focused to a point 14 typically having a surface area in the order of 1 mm$^2$. The material 12 can be moved relative to the laser 10 about two mutually perpendicular axes so that the laser can be moved to any point on the surface 12.

The laser 10 is operated to produce pulsed radiation and focused to the point 14 so that the intensity of the beam is sufficient to generate a laser supported detonation wave. Typically, the threshold for plasma ignition leading to a detonation wave is about $5 \times 10^8$ watts/cm$^2$, i.e. a fluence in the order of 20J/cm$^2$.

In use the laser 20 produces pulsed radiation and the material within the spot 14 is irradiated at a sufficient intensity so as to form a surface plasma. Focussing of this radiation to produce an intensity exceeding the threshold for plasma production results in an evaporation and melting of surface material. Material removed forms a vapor over the surface that is heated by the laser beam to form a plasma. The shock wave associated with this plasma impacts onto the heated surface and produces a surface roughening as liquid material is ejected away from the focal spot. It is this surface roughening together with oxidation of the hot material that produces a change in the reflectivity and emissivity of the material. As the laser 10 is operated, the spot 14 is scanned across the surface 12 by movement about one of the axes. After completion of a row along one axis, the material is moved along the other axis and the scan repeated. This continues until the whole surface has been treated and a roughening of the entire surface has been effected. Hence an extended bulk area is built up by successive scans.

The preferred apparatus is an Excimer laser, operating at a wavelength of 308 nm and providing an energy per pulse of between 10 and 1000 mJ and a pulse width of less than 100 ns, typically in the order of 30 ns. This is operated at a repetition rate of 50 Hz with a scan speed across the surface of 7 in/min. Typically, each area on the treated surface will be irradiated by a plurality of pulses, preferably more than 5 and more preferably more than 7. In the example noted above, the number of pulses is 17. The effect of irradiating the surface as noted above is to provide a number of overlapping pits indicated at 16 arranged in lines indicated at 18 across the surface. As will be described in further detail below, the surfaces produced exhibit a characteristic roughness with gross features produced by the overlapping pulses and, within the gross features, a small scale structure with a scale of less than 50 microns.

Figure 2:
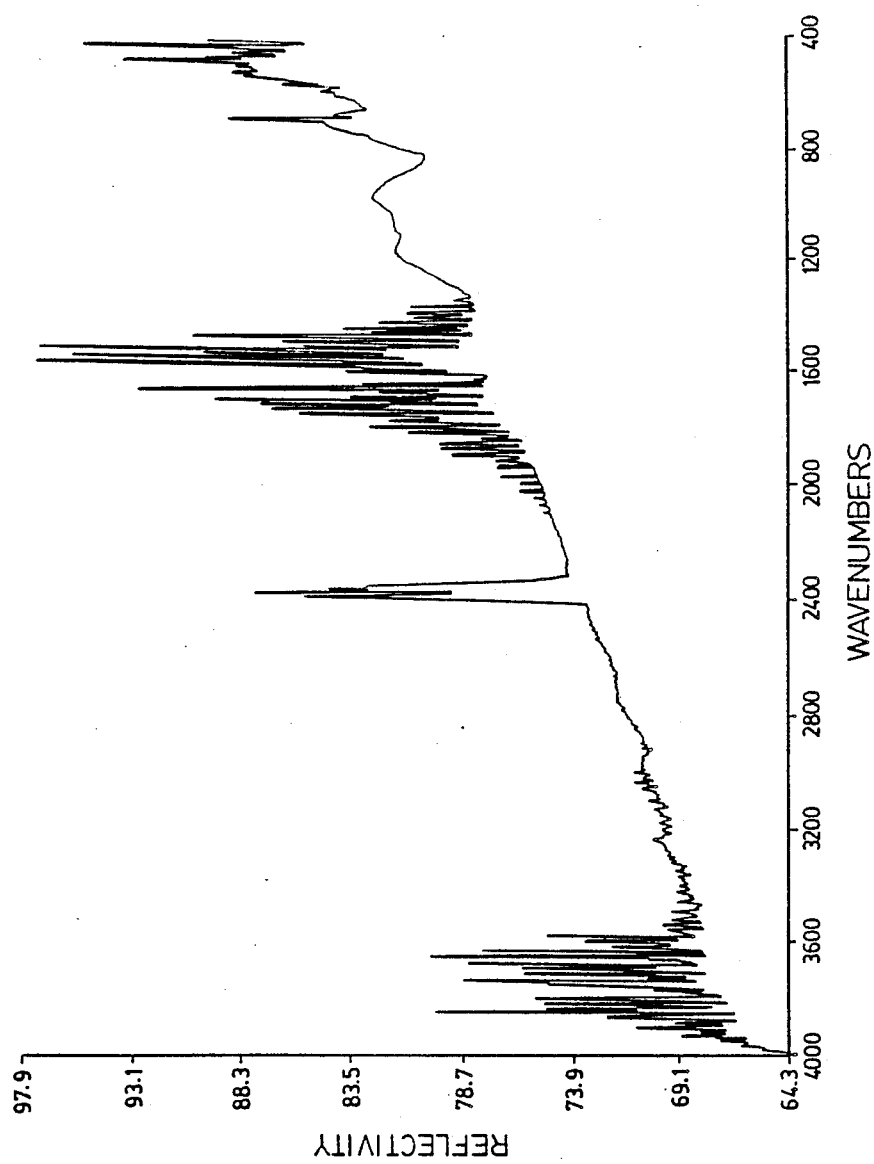
FIG. 2 is a graph illustrating the reflective characteristics of the surface of one type of material.
Figure 3:
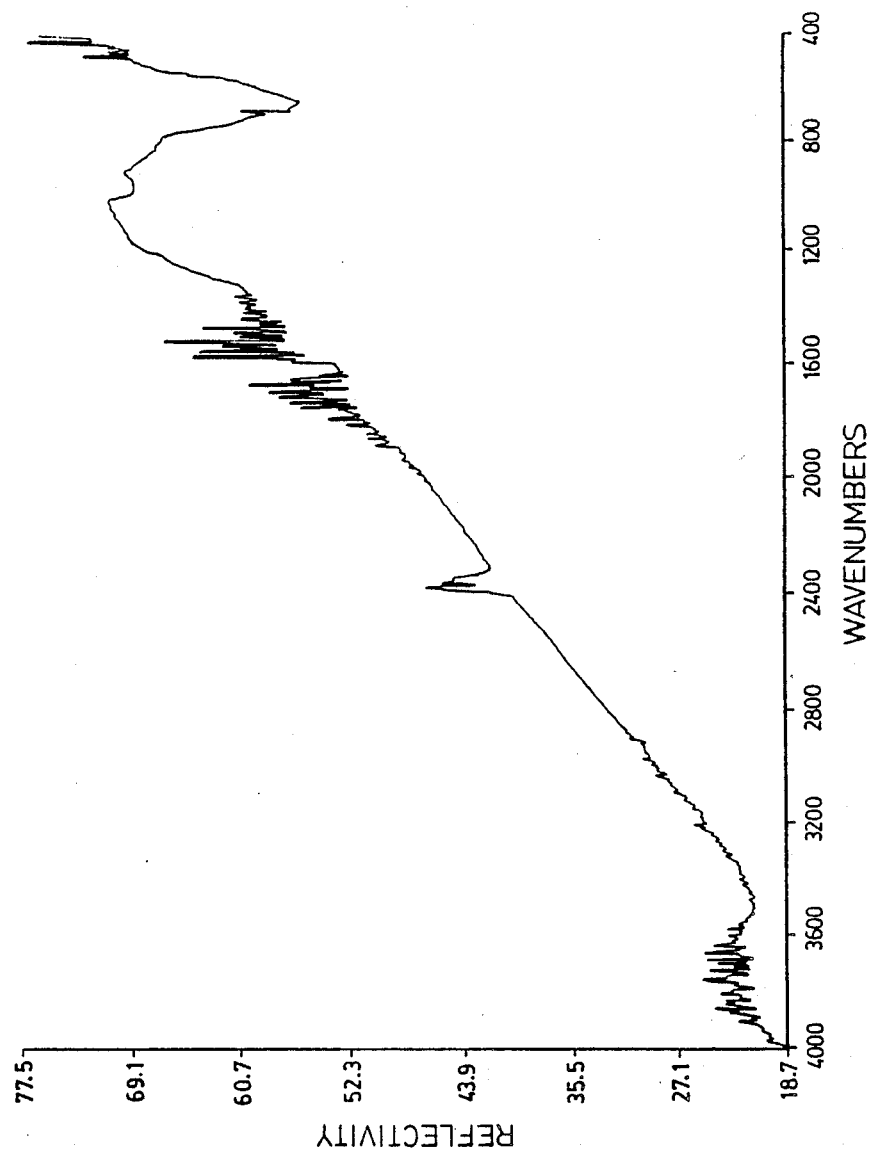
FIG. 3 is a graph illustrating the wavelength dependence of the reflectivity of the surface represented in FIG. 2 after the laser treatment technique of FIG. 1.

The change of reflectivity as a result of this treatment particularized above on the surface of stainless steel may be seen with reference to FIGS. 2 and 3. FIG. 2 shows a plot of reflectivity versus wave number (1/(cm)) for untreated material. It will be seen that the reflectivity varies between 67% and 80%, between 4000 and 400 wavenumbers with characteristic peaks exhibited at particular wavenumbers.

As seen from FIG. 3, after being treated in a manner described above, the reflectivity has been reduced to a range of 18–69%, between the same wavenumber limits with the peaks significantly diminished.

Figure 4:
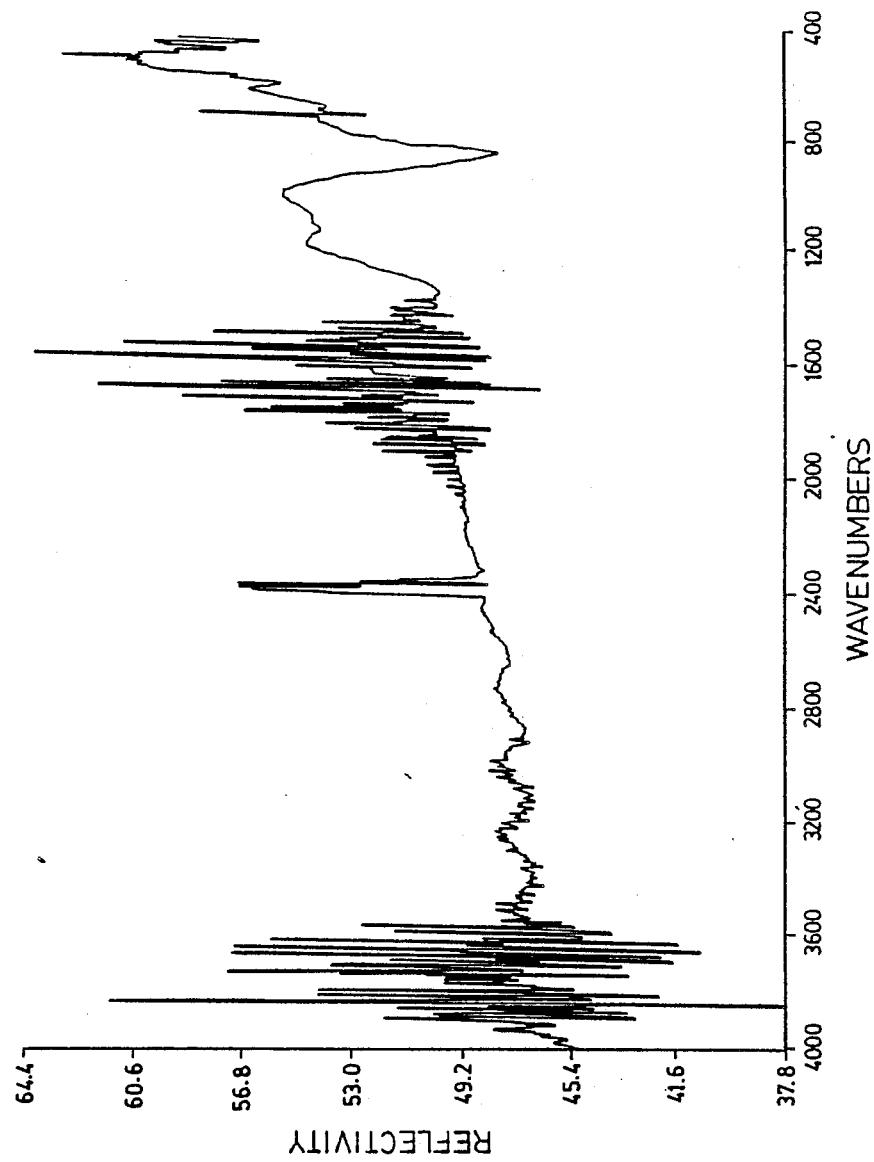
FIG. 4 is a graph illustrating the reflective characteristics of a surface of a second material (aluminum)
Figure 5:
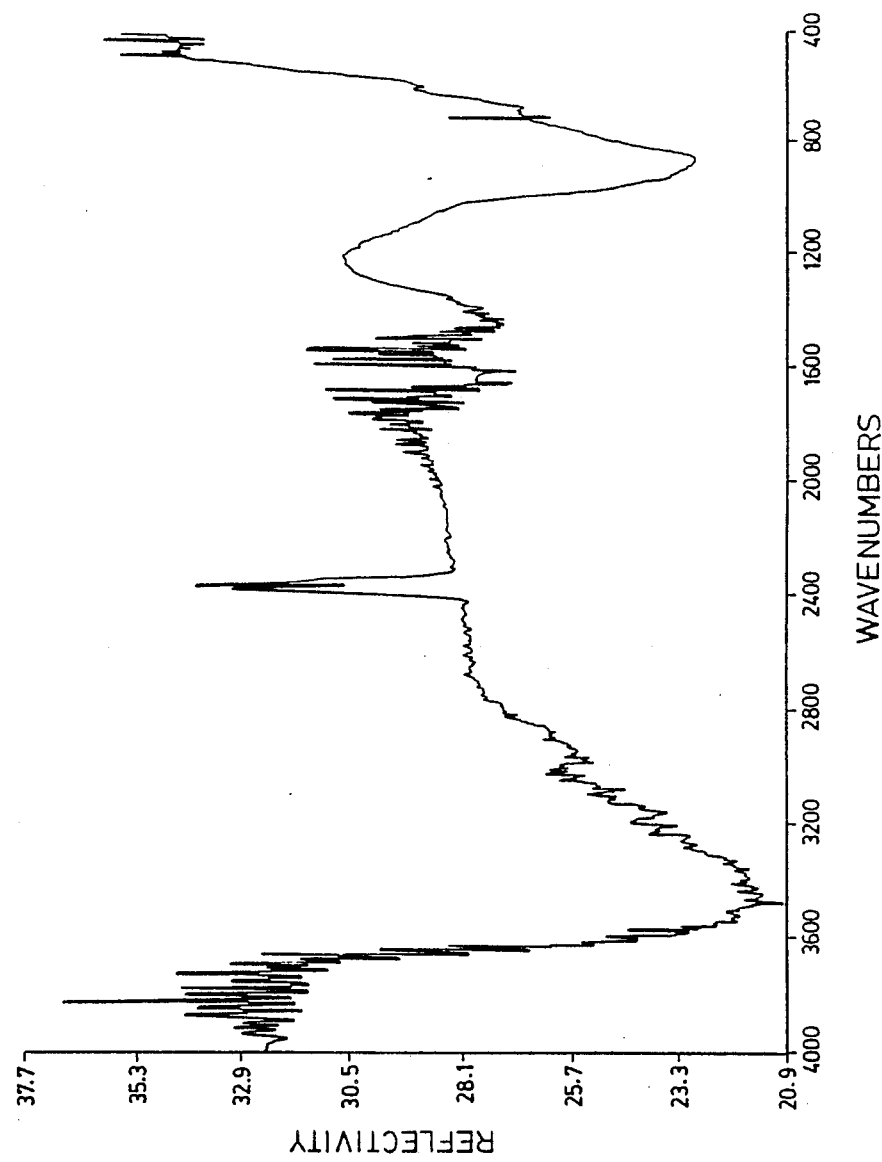
FIG. 5 is a graph illustrating the reflective characteristics of the surface represented in FIG. 4 following the laser treatment technique represented in FIG. 1.

FIGS. 4 and 5 show the effect of the treatment on aluminum. In FIG. 4 it can be seen that the reflectivity for untreated material varies between 47 and 57% between 4000 and 400 wavenumbers. After treatment as shown in FIG. 5, the reflectivity has been reduced over the entire range between 4000 and 400 wavenumbers. Of particular importance in the curve shown in FIG. 5 is the dramatic reduction in reflectivity at 3600 wavenumbers and at 800 wavenumbers. The decrease at 3600 wave-numbers may be attributed to the formation of surface hydroxide during treatment. Similarly, the formation of a surface oxide causes a corresponding reduction in the reflectivity of the treated sample at 800 wavenumbers.

It will be apparent, therefore, that the surface treatment can be enhanced by providing a localized atmosphere, such as an oxygen-rich atmosphere, at the focal point of the laser beam during irradiation. This would promote the formation of oxides and reduce the reflectivity further. Similarly, it may be preferred to utilize nitrogen-rich atmospheres to generate nitrides at the surface if they show a significant reduction in surface reflectivity at useful wavelengths.

Figure 6:
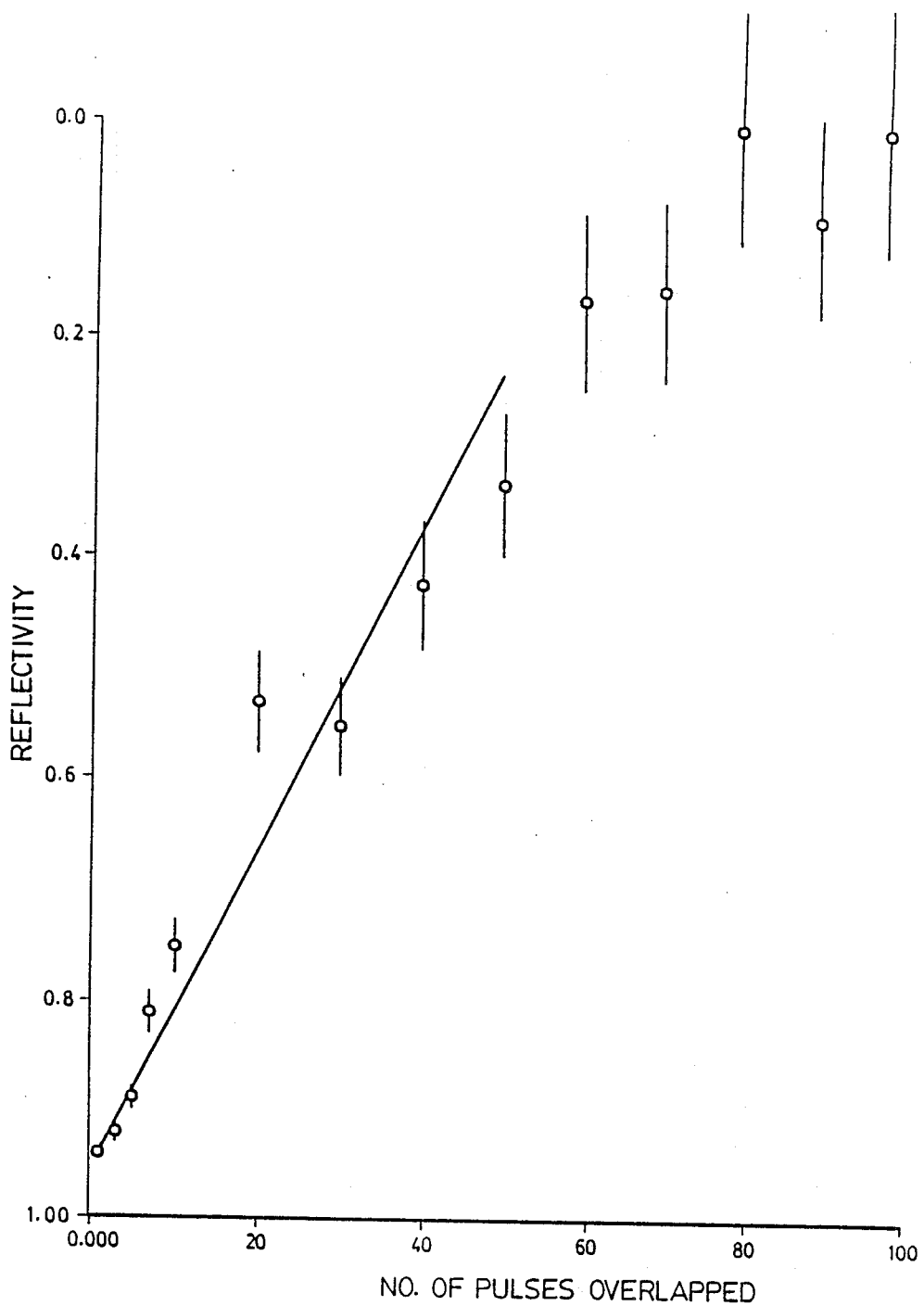
FIG. 6 is a graph illustrating the effect on the reflective characteristics of an aluminum surface caused by varying the periods of treatment by the technique represented in FIG. 1.

The effect of the number of overlapping pulses is best illustrated in FIG. 6. This curve shows the reflectivity at a fixed wavelength, typically that used by a laser radar, i e. 10.6 micron versus the number of overlapping laser pulses for aluminum treated with a pulsed excimer laser operating under the conditions noted above with an energy of 160 mJ/pulse. It will be seen that as the number of pulses increases, i.e. the scanning speed is reduced or the pulse repetition rate increased, the reflectivity of the surface to radiation at a wavelength of 10.6 micron is progressively decreased, i.e. the emissivity at 10.6 micron is progressively increased. Once the material has been subjected to a certain number of pulses, in this case 60 or so, there is tendency for the curve to become nonlinear, indicating that minimum reflectivity has been attained. The number of pulses required to attain minimum reflectivity will of course vary from material to material and with the wavelength used to interrogate the surface. In each case however a significant effect is obtained after several pulses, more particularly 5 pulses and more particularly after 70 to 100 pulses.

Figure 7:
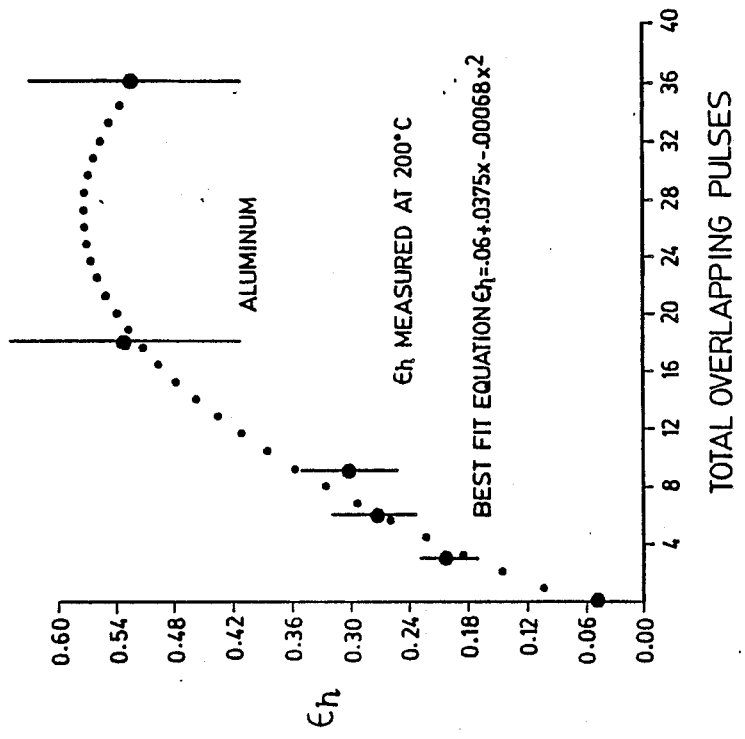
FIG. 7 is a curve similar to FIG. 6 showing the relationship between emissivity efficiency and the number of pulses of laser radiation where the pulses partially overlap.

This effect is attributable to the surface roughening and to the chemical change that occurs at the surface. As noted in FIG. 6, as the number of pulses increase, the oxide creating process is enhanced which contributes to the decrease in reflectivity until such time as saturation of the surface with oxide occurs at between 60 and 70 pulses. As can be seen from FIG. 7 a corresponding increase in the emissivity of the surface is obtained. The curve of FIG. 7 plots emissivity efficiency expressed as a percentage of black body radiation against the number of pulses to which the surface is subjected. It will be observed that a rapid increase in emissivity occurs after several pulses with a progressive levelling off after 20 to 30 pulses.

Figure 8:
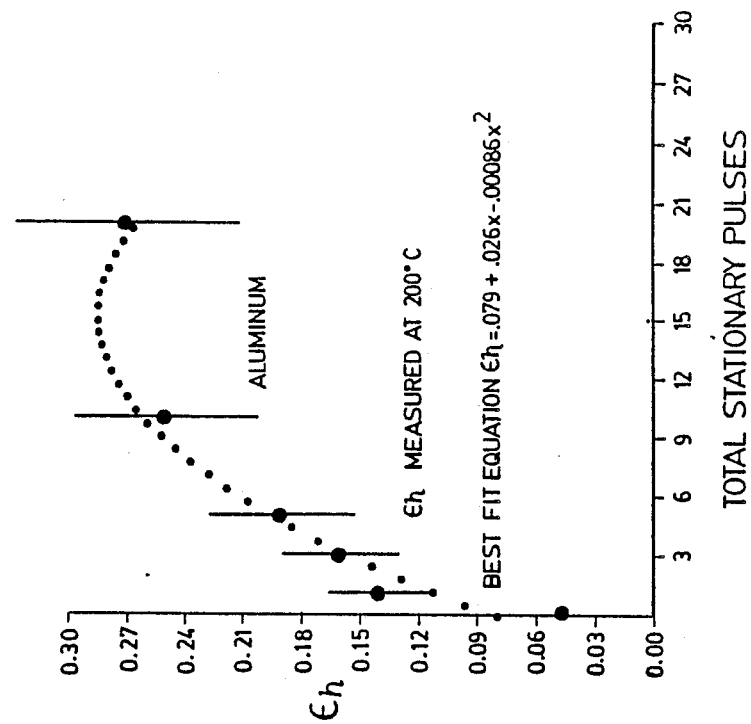
FIG. 8 is a curve similar to FIG. 7 showing relationship between emissivity efficiency and number of pulses for a stationary sample of material.

FIG. 8 shows similar results where successive pulses are coincident, i.e. the laser and material are relatively fixed, and shows that whilst a similar effect is obtained, its magnitude is approximately 50% of that produced with partially overlapping pulses. Accordingly, it is believed that relative movement between the laser and the material surface is beneficial for producing the optimum surface effect as well as facilitating processing.

Figure 9:
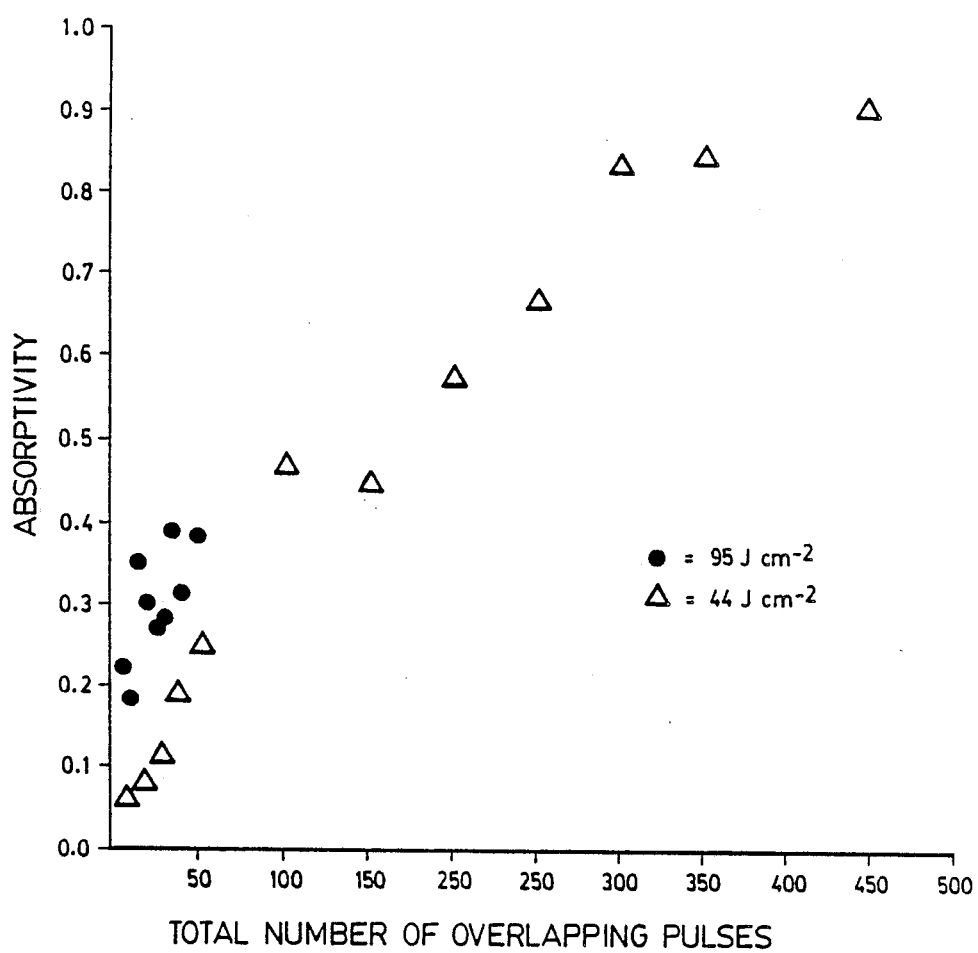
FIG. 9 is a curve showing the effect of different energies of the incident beam on the absorptivity of an aluminum surface.

The effect of intensity of the incident beam is illustrated in FIG. 9. It will be noted that with higher energy levels, the initial change in reflectivity is increased but rapidly reaches a limit. The lower energy level also shows a dramatic increase but continues to increase the absorptivity (i.e. reduce the reflectivity over a greater number of pulses). This effect may be attributed to the material removal that occurs at higher energy levels which inhibits the formation or deposition of oxides. In this Figure the absorbivity to radiation emitted from a $CO_2$ laser is plotted.

Figure 10:
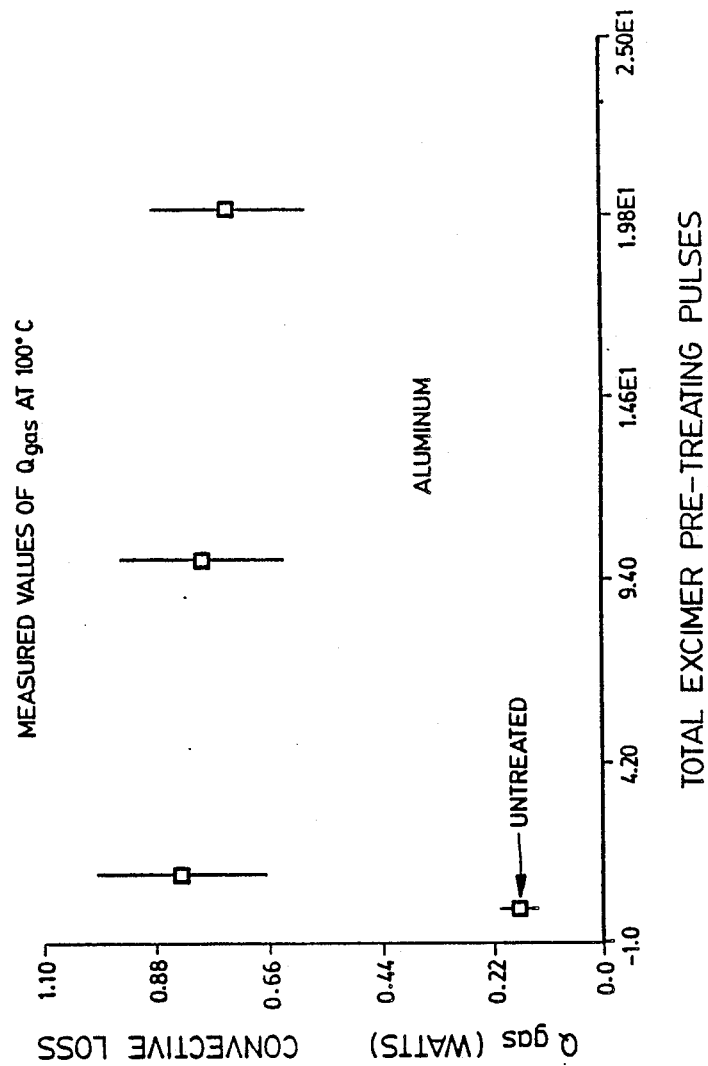
FIG. 10 is a curve showing the effect of varying amounts of the treatment of FIG. 1 on the convective loss of the material used in FIGS. 6 to 9.

A further beneficial effect is illustrated in FIG. 10 where the effect of the resultant surface on the convective loss is shown. It will be seen that after relatively few pulses a significant increase in convective loss occurs, in the order of 300% to 400%. Thereafter the convective loss is relatively constant.

It may be surmised therefore that the initial exposure of the surface produces a surface roughening that increases surface area and reduces reflectivity. Progressively increasing numbers of pulses maintain the increased surface area but also promote formation of chemical compounds, particularly oxides that contribute to the further reduction in reflectivity.

Figure 11:
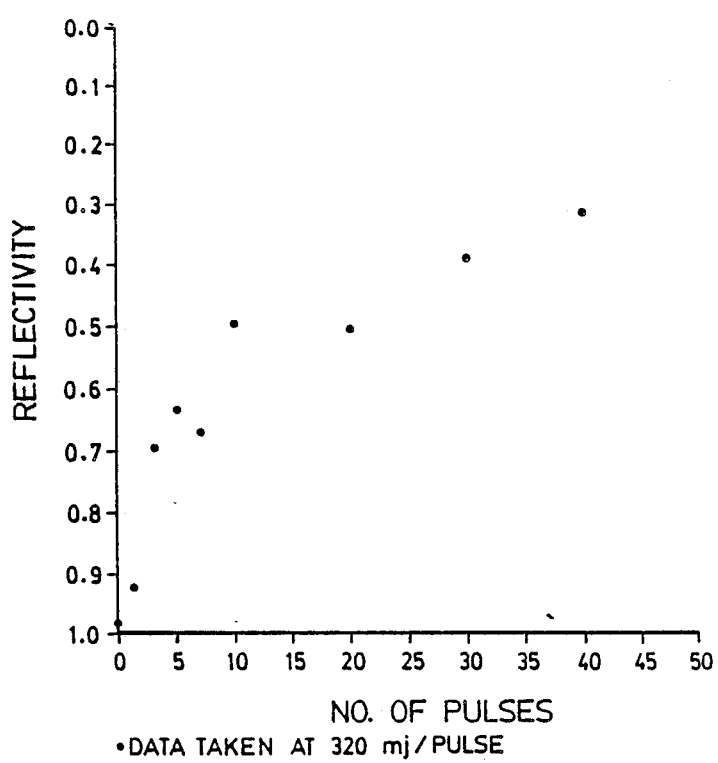
FIG. 11 is a graph similar to FIG. 6 showing the effect of the treatment on copper.
Figure 13:
FIGS. 12 to 22 are reproductions and electron microscope scans of samples described in chart 1 below.
Figure 12:
Figure 15:
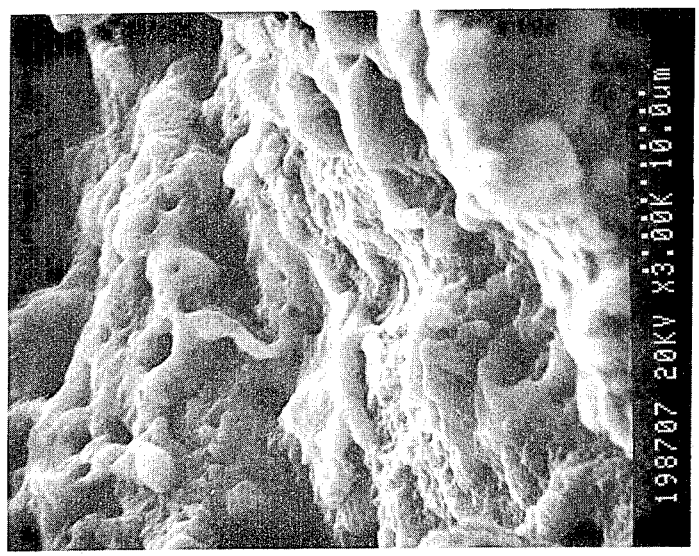
Figure 14:
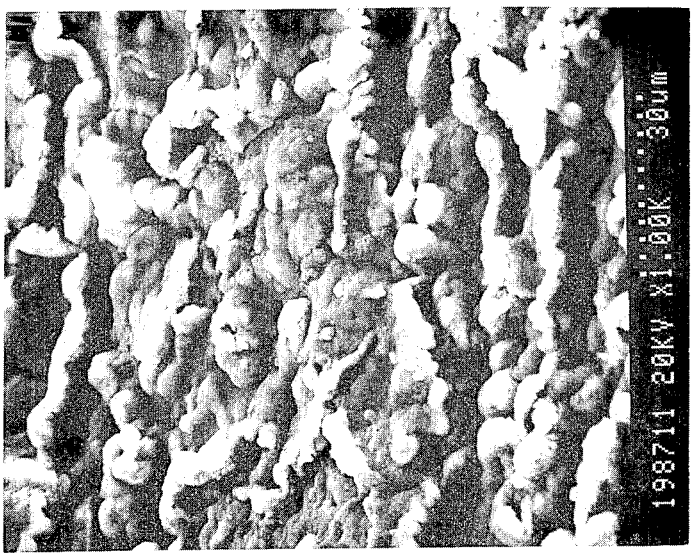
Figure 17:
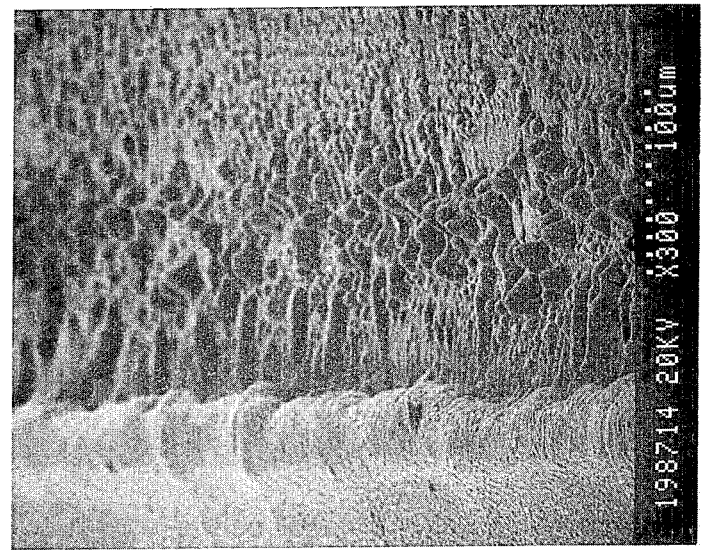
Figure 16:
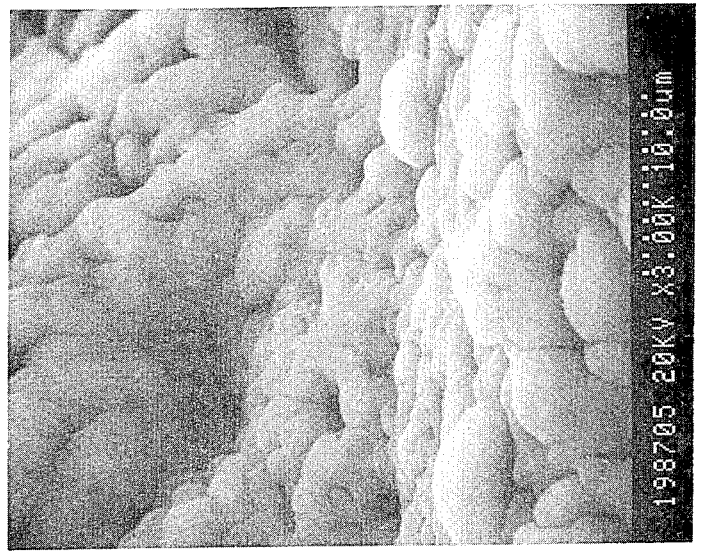
Figure 19:
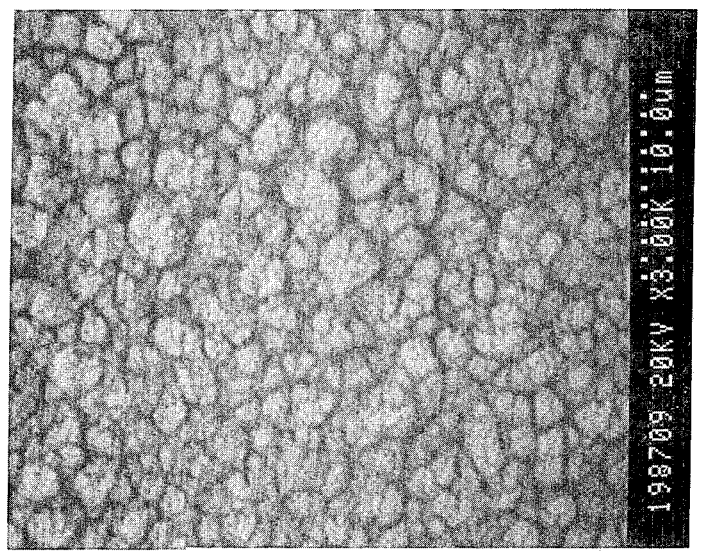
Figure 18:
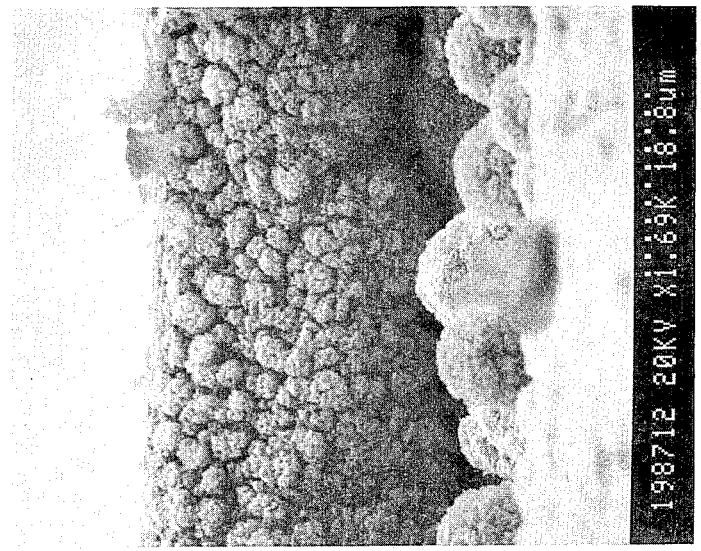
Figure 21:
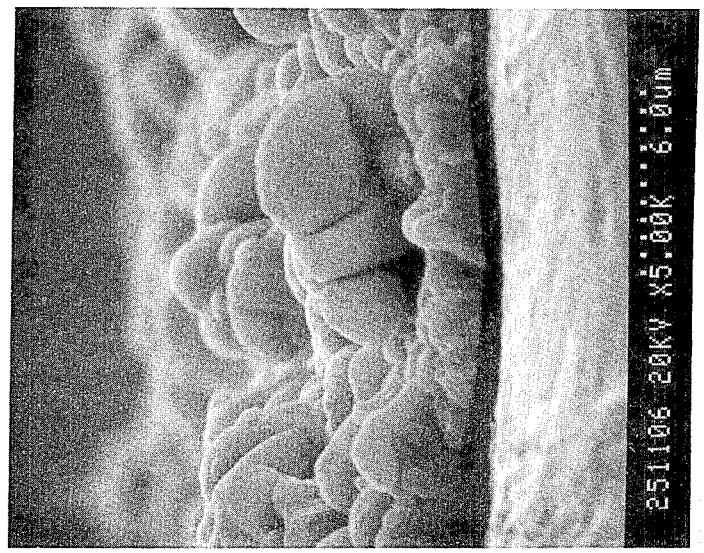
Figure 20:
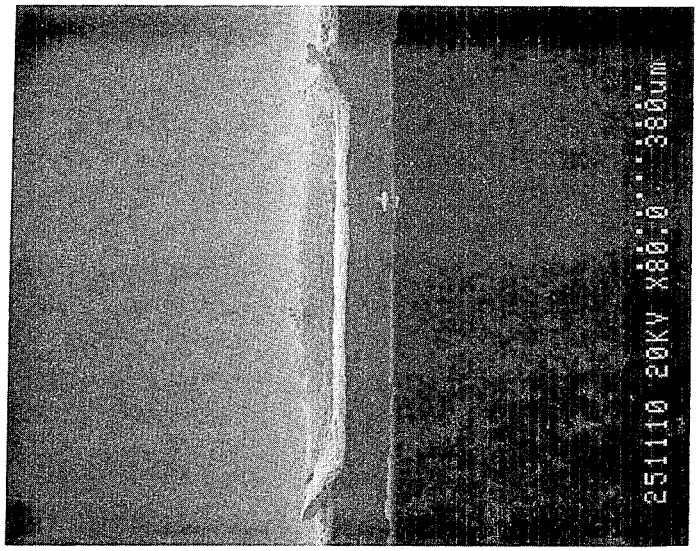

As may be seen in FIG. 11, a similar effect is obtained with copper as with aluminum with a significant change in reflectivity occurring after 5 pulses, more significantly after 10 or more pulses.

The parameters effecting surface treatment are illustrated in Table 1 below where tests produced under a variety of conditions are summarized.

TABLE I

| Excimer (303 n.M.) Laser Parameters | | Material | S.E.M. FIG. | Surface Characterization | Absorptivity |
|---|---|---|---|---|---|
| Fluence | Overlapping pulses | Al | 11 | surface roughness only 5-20 microns | .08 (8%) |
| 44 J/cm² | 50 | Type 1100 | 12 | underlying surface features covered with oxidized mat. | .25 (25%) |
|  | 500 | 500 microns thickness | 13 | new structure in oxidized material 10 microns. | .95 (95%) |
|  | 35 |  | 14 | fine structure, .5-20 microns within coarser structures. Shows beginnings of oxide growth. | .3 (30%) |
| 95 J/cm² | 50 |  | 14 | continued oxide growth, the filling up of the line structure. | .38 (38%) |
|  |  | Cu | 15 | Top view showing edge of processed track & surrounding region. |  |
| 35 J/cm² | 36 | 126 micron thickness | 17 | side view of processed track, 2-5 micron structure. | .4 (40%) |
|  |  |  | 18 | top view showing structure within processed region. |  |
| 26 J/cm² | 150 stationary pulses |  | 18 | cross-section shows that 150 pulses has removed Cu to a depth of 100 microns, with no modification to the underlying bulk material. |  |
| 26 J/cm² | 750 stationary pulses |  | 20 | shows redeposited oxidize droplets outside of irradiated region. Particle size 1-6 microns. Foreground shows untreated smooth Cu surface exposed in the cross-section. |  |
| 65 J/cm² | 930 stationary pulses | Al | 21 | shows recrystallized structure within irradiated region. Asperity structure 18 microns. Central depressed shows deformation due shock wave associated with such pulse. |  |

The surfaces showing reduced reflectivity and increased emissivity each have a roughness with small scale structures of less than 50 microns and it will be observed that as the number of pulses increases, oxides are formed further contributing to the reduction in reflectivity.

At the high incident intensities used in the present invention, the primary effect appears to be the production of a surface plasma. This plasma is created when vaporized target material is heated by incident radiation via inverse bremsstrahlung. This appears to be followed by the formation of a laser supported absorption wave that further couples laser energy into the target, increasing the thereby material removal rate. Under these conditions, liquid is expelled from the focal point by the shock wave associated with this plasma. The hot liquid droplets are oxidized during the process, likely by reaction with atomic oxygen in the breakdown plasma. The roughened surface contains small oxide particles that have been entrained in a rough metal matrix. Increased coupling of 10.6 micron radiation to this surface is believed to be due to this roughening and to the presence of entrained oxide particles.

Under heavier processing conditions, i.e. exposure to a greater number of pulses, particle deposition results in the formation of a thick (i.e. less than or equal to 10 microns) oxide layer that yields a high coupling coefficient (i.e. low reflectivity) at 10.6 m. In this case, coupling appears to arise primarily by absorption of incident radiation in this oxide layer.

The above-described surface treatment technique is very rapid and relatively low cost. Moreover, because it is a permanent change in the surface, it is not prone to abrasion and does not change the electrical properties of the surface.

When used on an armament, the treatment can be applied selectively to alter the silhouette of the vehicle or to change the signature obtained from the vehicle under laser radar interrogation. Such treatment is effectively a form of electronic camouflage.

Similarly, when the surface treatment is applied to a radiating surface such as aluminum, a large number of overlapping pulses produce an almost black oxide coating as noted in FIG. 6, providing a very good emitter and therefore enhancing radiative cooling efficiency. This is particularly beneficial on spacecraft where radiative cooling is a dominant effect.

Figure 22:
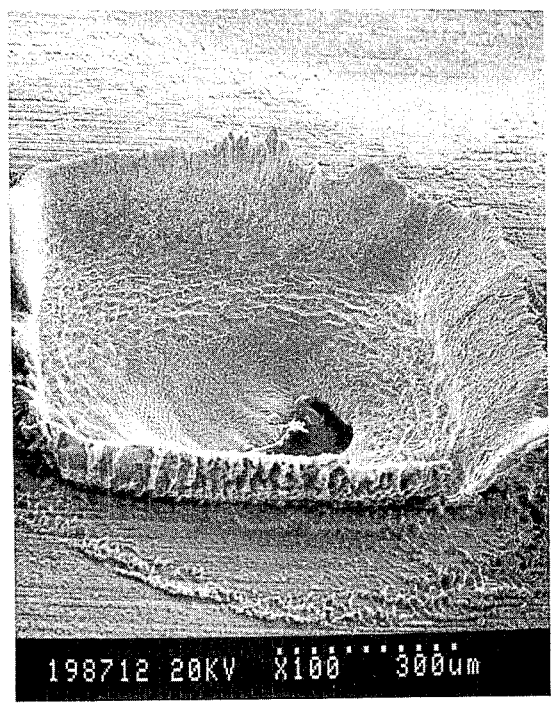
Figure 23:
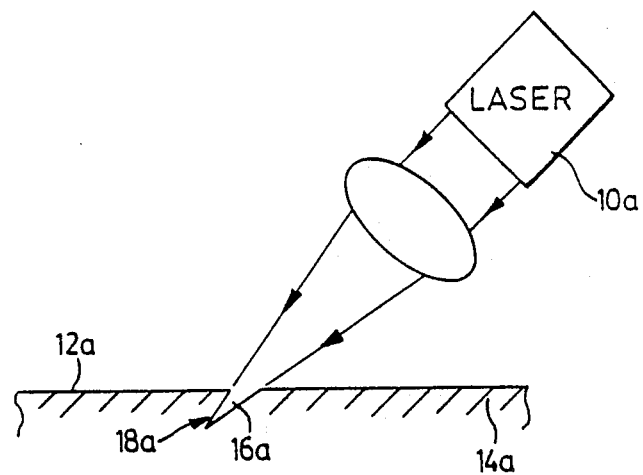
FIG. 23 is a schematic representation of an alternative apparatus to that shown in FIG. 1.
Figure 24:
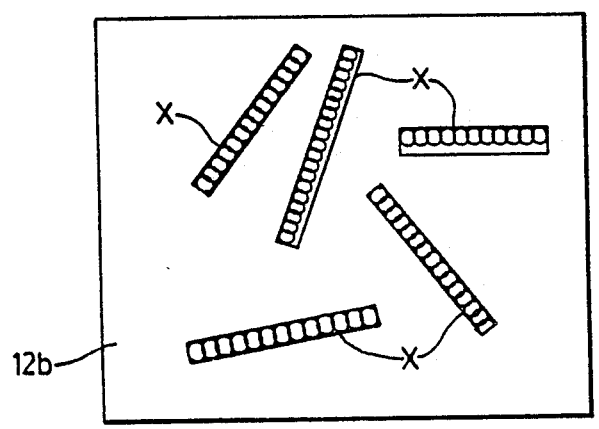
FIG. 24 is a representation of a material having selected areas of its surface treated by the technique of FIG. 1.

With the treatment described above, the overlapping of the pits 18 produces fine grooves on the surface and with repeated scans, a bulk surface area of the desired characteristics may be produced. As best seen in FIG. 22, a particularly beneficial effect may be obtained if the radiation does not impinge normally to the surface. The axis of the last 10a is inclined to the surface of the material 12a to produce lines 18a as noted above. It has been found that when the laser radiation does not impinge normally on the surface, then the grooves created are undercut or angled with respect to the surface. Such angled grooves produce a change due to both components of reflectivity, that is spectral and diffuse reflectivity, being altered. This again can produce a pronounced effect leading to a reduction in the reflectivity of the surface.

By processing only selected areas of a surface so as to decrease the reflectivity of these areas, the average reflectivity over a large area can be effectively reduced. This eliminates the need for processing an entire surface so as to reduce its average value to some desired level. For example, in FIG. 9 selected areas of the surface 14b have been treated as indicated at X. If the reflectivity of the untreated surface is $R_A$ while that of a treated strip is $R_x$, then the average reflectivity R, of a sample of total area A containing area X of treated surface is $R = R_x X + R_A(A - X)$. For example, if A = 1m², X = 0.5 m², and $R_A = 0.9$ while $R_x = 0.1$; then the average reflectivity of this surface is reduced to R = 0.5. This significant reduction in reflectivity has been accomplished by processing only 50% of the surface.

The treated areas may be arranged in random patterns across the surface or may follow a predetermined pattern to produce a desired effect. Different areas may be treated in different ways to provide a maximum effect at different wavelengths. Similarly, the treated areas may be applied to selected areas to change the silhouette of a vehicle when interrogated by laser radar.

It will be apparent that the surface treatment may be used in a number of ways to provide a change in the reflectivity of a surface. The exact nature of the treatment is variable to produce particularly desirable effects such as a minimum reflectivity to a particular wavelength or a black oxide coating to maximize emissivity for black body radiation.

We claim:

1. A method of modifying the reflectivity of a surface of a material comprising the steps of:
    irradiating the surface with a beam of coherent pulsed radiation, said pulsed radiation being at a power level sufficient to melt the surface and thereby to generate a surface plasma so that the shock wave associated with the surface plasma produces a roughening of said surface; and
    repeatedly scanning said beam across said surface to form successive closely spaced lines on said surface as a result of said roughening of said surface.

2. A method according to claim 1 including the step of promoting chemical change at said surface.

3. A method according to claim 2 wherein the chemical change is promoted by providing a localised atmosphere at said surface.

4. A method according to claim 3 wherein said localised atmosphere is selected from the group comprising oxygen and nitrogen.

5. A method according to claim 1 wherein said beam scans said surface at a rate to cause successive pulses of radiation to overlap on said surface.

6. A method according to claim 1 wherein said beam is inclined to the surface of the material.

7. A method according to claim 6 wherein said beam scans said surface at a rate to cause successive pulses of radiation to overlap.

8. A method of reducing the average reflectivity of a surface of a material comprising the steps of:
    irradiating said surface with a beam of coherent pulsed radiation, said pulsed radiation being at a power level sufficient to melt the surface and thereby to generate a surface plasma so that the shock wave associated with the surface plasma produces a roughening of said surface; and
    repeatedly scanning said beam across selected areas of said surface to form successive closely spaced lines on said selected areas of said surface thereby to reduce the reflectivity of said selected areas, the average reflectivity thereby being reduced as a function of the reflectivity and the surface area of the selected areas.

9. A method according to claim 8 wherein said selected areas are arranged in a random pattern on said surface.

10. A method according to claim 8 including the step of promoting chemical change at said surface.

11. A method according to claim 10 wherein the chemical change is promoted by providing a localised atmosphere at said surface.

12. A method according to claim 11 wherein said localised atmosphere is selected from the group comprising oxygen and nitrogen.

13. A method according to claim 8 wherein said beam scans said surface at a rate to cause successive pulses of radiation to overlap on said surface.

14. A method according to claim 8 wherein said beam is inclined to the surface of the material.

15. A method according to claim 14 wherein said beam scans said surface at a rate to cause successive pulses of radiation to overlap.

16. A method of changing the signature of a surface when interrogated by laser radiation comprising the steps of treating selected areas of said surface to reduce the reflectivity of said selected areas wherein the reflectivity of said selected areas is reduced by irradiating the surface with a beam of coherent pulsed radiation, said radiation being at a power level sufficient to melt the surface and thereby to generate a surface plasma so that the shock wave associated with the surface plasma produces a roughening of said surface and repeatedly scanning said beam across said selected areas to form successive closely spaced lines on said surface as a result of said roughening of said surface.

17. A method according to claim 16 wherein said selected areas are arranged to alter the silhouette of said surface.

* * * * *